United States Patent
McCauley

(10) Patent No.: US 8,613,669 B1
(45) Date of Patent: Dec. 24, 2013

(54) GAME CONTROLLER WITH DISPLAY AND METHODS THEREFOR

(75) Inventor: Jack J. McCauley, Danville, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 1828 days.

(21) Appl. No.: 10/836,468

(22) Filed: Apr. 30, 2004

(51) Int. Cl.
*A63F 9/00* (2006.01)

(52) U.S. Cl.
USPC .......................................................... 463/42

(58) Field of Classification Search
USPC .......................................................... 463/42
See application file for complete search history.

(56) References Cited

U.S. PATENT DOCUMENTS

| | | | |
|---|---|---|---|
| D350,962 S | 9/1994 | Reardon et al. | |
| D357,685 S | 4/1995 | Reardon et al. | |
| 5,519,433 A | 5/1996 | Lappington et al. | |
| 5,759,100 A * | 6/1998 | Nakanishi | 463/37 |
| 5,805,139 A * | 9/1998 | Uehara | 345/156 |
| 5,959,596 A * | 9/1999 | McCarten et al. | 345/2.1 |
| 5,971,855 A * | 10/1999 | Ng | 463/42 |
| 5,973,612 A * | 10/1999 | Deo et al. | 340/7.58 |
| 6,049,316 A * | 4/2000 | Nolan et al. | 345/698 |
| 6,272,283 B1 * | 8/2001 | Nguyen | 386/94 |
| 6,309,301 B1 | 10/2001 | Sano | |
| 6,478,679 B1 | 11/2002 | Himoto et al. | |
| 6,524,188 B2 | 2/2003 | Wang | |
| 6,540,614 B1 * | 4/2003 | Nishino et al. | 463/40 |
| 6,615,204 B1 * | 9/2003 | Menon | 1/1 |
| 6,692,358 B2 | 2/2004 | Lawrence et al. | |
| 6,703,962 B1 | 3/2004 | Marics et al. | |
| 6,719,633 B1 * | 4/2004 | Leifer et al. | 463/39 |
| 6,773,349 B2 * | 8/2004 | Hussaini et al. | 463/38 |
| 6,810,528 B1 * | 10/2004 | Chatani | 725/109 |
| 6,821,203 B2 | 11/2004 | Suga et al. | |
| 6,878,067 B2 | 4/2005 | Blanco | |
| 6,881,147 B2 * | 4/2005 | Naghi et al. | 463/35 |
| 6,981,918 B2 | 1/2006 | Blanco | |

(Continued)

OTHER PUBLICATIONS

Arstechnica. Mar. 2004. <http://episteme.arstechnica.com/eve/forums/a/tpc/f/5790099626231/m/436004182631>.*

(Continued)

*Primary Examiner* — Seng H Lim
(74) *Attorney, Agent, or Firm* — Klein, O'Neill & Singh, LLP

(57) ABSTRACT

A game controller having a video display and messaging capability is provided. Such a system is especially useful for video games with multiple players and also for communicating with non-players. In one embodiment, a game controller useful is coupled to a game console which is coupled to a wide area network. The game console is used by a person playing a game on the game console using the game controller. The game controller includes a video display capable of displaying a message sent from a second person over the wide area network. These messages can include textual, video and/or audio data. Messages can be sent from the game controller to the game console, and received from the game console to the game controller via a USB port. The video display can also be used to display game data from the game console. In some embodiment, the game controller includes a keypad for inputting a textual message for the second person. Game controller can also include a camera and/or a microphone for inputting video and/or audio data to be included in a message for the second person. Game controller can also include audible alerts via a speaker or mechanical alerts via an alerter, alerting the person about incoming messages.

18 Claims, 8 Drawing Sheets

(56) References Cited

U.S. PATENT DOCUMENTS

| | | | |
|---|---|---|---|
| 6,991,542 B2 | 1/2006 | Asami et al. | |
| 7,056,217 B1* | 6/2006 | Pelkey et al. | 463/43 |
| 7,611,409 B2* | 11/2009 | Muir et al. | 463/29 |
| 7,951,007 B2* | 5/2011 | Wolinsky | 463/42 |
| 2001/0018364 A1* | 8/2001 | Watanabe | 463/40 |
| 2002/0094069 A1* | 7/2002 | Takahashi et al. | 379/93.17 |
| 2002/0137565 A1* | 9/2002 | Blanco | 463/46 |
| 2002/0142842 A1* | 10/2002 | Easley et al. | 463/42 |
| 2002/0147045 A1* | 10/2002 | La Mura et al. | 463/42 |
| 2002/0174248 A1* | 11/2002 | Morriss | 709/238 |
| 2002/0180782 A1* | 12/2002 | Natsuno | 345/743 |
| 2003/0061606 A1* | 3/2003 | Hartwig et al. | 725/25 |
| 2003/0092493 A1* | 5/2003 | Shimizu et al. | 463/42 |
| 2003/0216183 A1* | 11/2003 | Danieli et al. | 463/42 |
| 2003/0220142 A1* | 11/2003 | Siegel | 463/37 |
| 2003/0232648 A1* | 12/2003 | Prindle | 463/40 |
| 2004/0005923 A1 | 1/2004 | Allard et al. | |
| 2004/0023719 A1* | 2/2004 | Hussaini et al. | 463/37 |
| 2004/0116183 A1* | 6/2004 | Prindle | 463/42 |
| 2004/0137984 A1 | 7/2004 | Salter | |
| 2004/0180720 A1* | 9/2004 | Nashi et al. | 463/37 |
| 2004/0196256 A1* | 10/2004 | Wobbrock et al. | 345/156 |
| 2004/0222970 A1* | 11/2004 | Martinez et al. | 345/169 |
| 2004/0224763 A1* | 11/2004 | Lum et al. | 463/36 |
| 2004/0224765 A1* | 11/2004 | Martinez et al. | 463/37 |
| 2004/0229695 A1* | 11/2004 | Hussaini et al. | 463/38 |
| 2004/0235566 A1* | 11/2004 | Hussaini et al. | 463/37 |
| 2005/0003761 A1* | 1/2005 | Chandley | 455/41.3 |
| 2005/0043095 A1* | 2/2005 | Larson | 463/42 |
| 2005/0060470 A1* | 3/2005 | Main et al. | 710/305 |
| 2005/0105777 A1* | 5/2005 | Kozlowski et al. | 382/115 |
| 2005/0229103 A1* | 10/2005 | King | 715/741 |
| 2005/0246470 A1* | 11/2005 | Brenner | 710/303 |
| 2006/0007151 A1* | 1/2006 | Ram | 345/163 |
| 2006/0025214 A1* | 2/2006 | Smith | 463/30 |
| 2006/0035711 A1* | 2/2006 | Samuels | 463/42 |
| 2006/0058101 A1 | 3/2006 | Rigopulos | |
| 2006/0068910 A1* | 3/2006 | Schmidt et al. | 463/40 |
| 2007/0099703 A1* | 5/2007 | Terebilo | 463/42 |

OTHER PUBLICATIONS

Ganger, Anish. "Learn how you can connect your laptop to the internet via your mobile phone." Aug. 28, 2003. <http://www.rediff.com/search/2003/aug/28mobile.htm>.*

"Report of Novelty Search" by Patentec, dated Mar. 23, 2004.

"Report of Novelty Search" by Patentec, dated May 18, 2006.

* cited by examiner

US 8,613,669 B1

GAME CONTROLLER WITH DISPLAY AND METHODS THEREFOR

BACKGROUND OF THE INVENTION

The present invention relates to video game systems. More particularly, the present invention relates to a video game controller having a video display and messaging capability.

Computer video games have evolved from the early games, such as "pong", played on a personal computer, to the present day sophisticated games with multiple players playing over the internet. These internet-based games generally require players to register their IP address with a website so that they can interact with each other.

Most video game consoles are designed to operate with a television (or video monitor), and hence do not include a video display. The game consoles are typically packaged with one or more game controllers. Most game controllers do not have a video display. A few game controllers include a video display for displaying the same video images generated by the game console for the television.

Video games generally do not permit player to communicate with each other in a spontaneous manner, such as sending a message "take that" or "gotcha" which can add to the fun and interaction of the players.

Very often, players are so engrossed playing the video game that they become oblivious to events happening in the real world, such as the telephone ringing. In addition, the player may also forget important tasks on time, such as taking the weekly trash can out.

Hence there is a need for an improved game controller which enables a second player or a non-player to alert and to communicate with a first player while the first player is playing a video game using the improved game controller.

SUMMARY OF THE INVENTION

To achieve the foregoing and in accordance with the present invention, a game controller having a video display and messaging capability is provided. Such a system is especially useful for video games with multiple players and also for communicating with non-players.

In one embodiment, a game controller useful is coupled to a game console which is coupled to a wide area network. The game console is used by a person playing a game on the game console using the game controller. The game controller includes a video display capable of displaying a message sent from a second person over the wide area network. These messages can include textual, video and/or audio data. Messages can be sent from the game controller to the game console, and received from the game console to the game controller via a USB port. The video display can also be used to display game data from the game console.

In some embodiments, the game controller includes a keypad for inputting a textual message for the second person, and/or for controlling additional electronic devices. Game controller can also include a camera and/or a microphone for inputting video and/or audio data to be included in a message for the second person. Game controller can also include audible alerts via a speaker or mechanical alerts via an alerter, alerting the person about incoming messages.

Note that the various features of the present invention can be practiced alone or in combination. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

To facilitate discussion, FIGS. 1, 2, 3A, 3B, 4, 5, 6 and 7 include block diagrams and flow diagrams which illustrate the operation of one embodiment of a video game controller and a game console coupled to a network.

Figure 1:
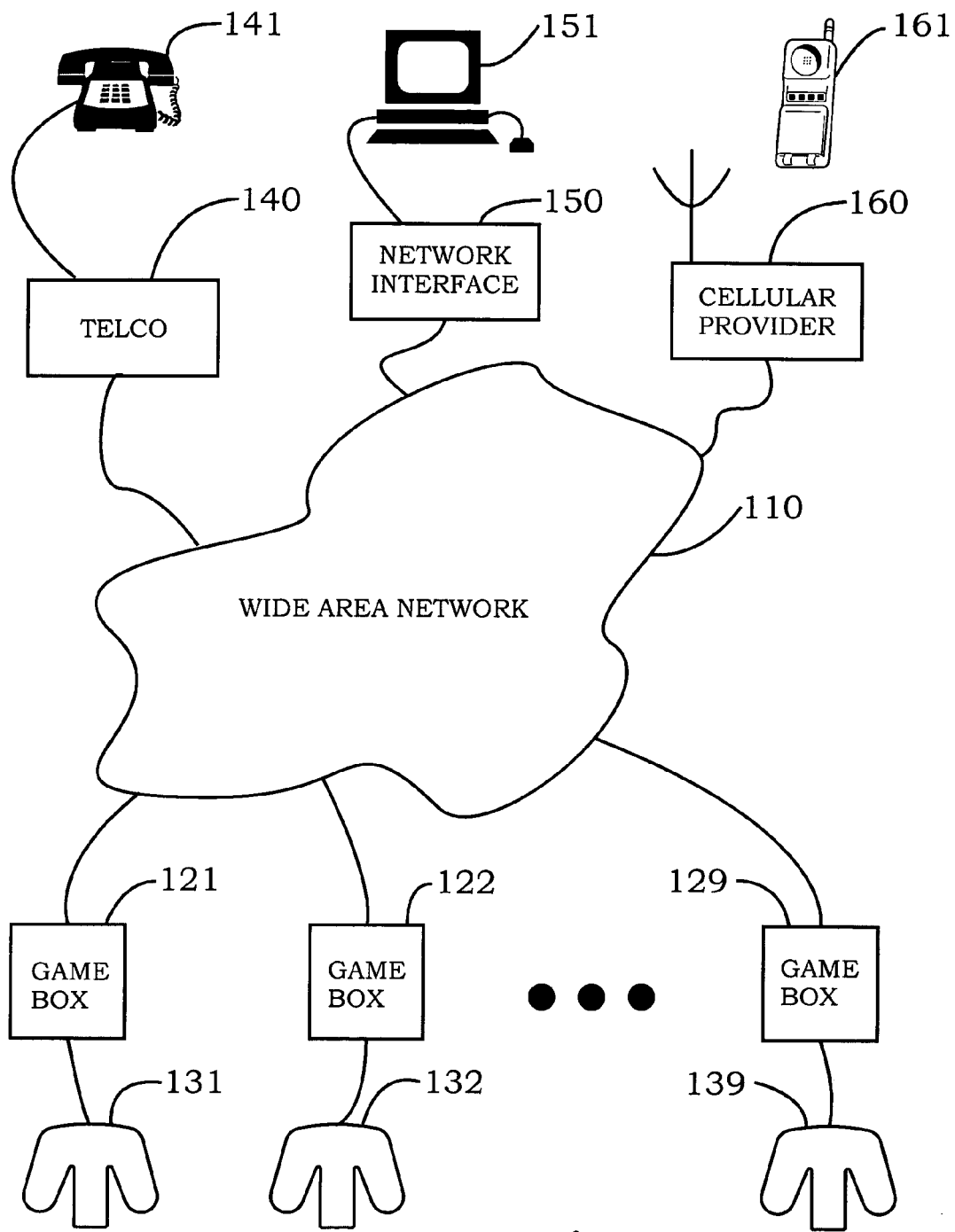
FIG. 1 is a block diagram illustrating the exemplary operation of a game controller coupled to a game console in accordance with the present invention.

As shown in FIG. 1, a plurality of game consoles 121, 122 ... 129 is coupled to a suitable network 110, e.g. a wide area network (WAN) such as the internet. WAN can be implemented using a wide range and combinations of wired and wireless technologies and protocols known to one skilled in the art, including Wi-Fi, Ethernet, Voice over IP (VoIP), ATM, and TCP/IP. In addition, the present invention is also useful in association with a local area network (LAN).

Each game console is coupled to at least one game controller. For example, game console 121 is coupled to at least one game controller 131. Telephone 141 is coupled to WAN 110 via local telephone company (Telco) 140, computer 151 is coupled to WAN 110 via network interface 150, and mobile (cellular) telephone 161 is coupled to internet 110 via cellular provider 160. In some embodiments, game consoles 121, 122 ... 129 are each coupled to a video monitor or television (not shown).

In accordance with the present invention, a first player operating any one of game controllers 131, 132 ... 139 can communicate with at least a second player operating another one of game controllers 131, 132 ... 139, or computer 151, or communicate with a non-player using telephone 141, computer 151 or mobile telephone 161.

Figure 2:
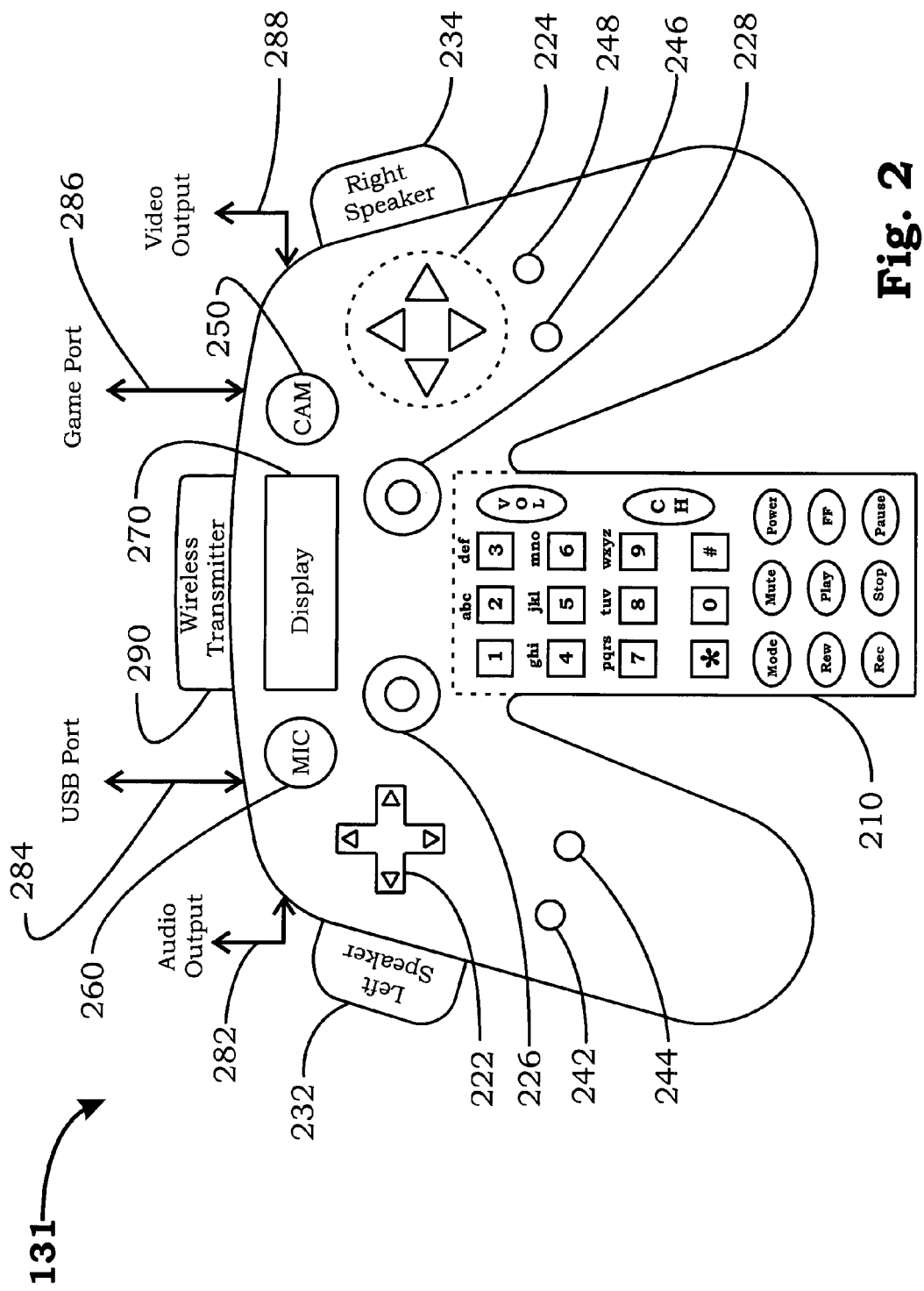
FIG. 2 shows one embodiment of the game controller of FIG. 1.

FIG. 2 illustrates one embodiment of controller 131. Note that the following discussion of exemplary controller 131 and console 121 also applied to controller 132 ... 139 and consoles 122 . . . 129. Controller 131 includes keypad 210, game directional controls 222, 224, joysticks 226, 228, speakers 232, 234, game control buttons 242, 244, 246, 248, video camera 250, microphone 260, video display 270, audio output 282, game console USB port 284, game console controller port 286, video output 288, and wireless transmitter 290.

In some embodiments, keypad 210 of controller 131 can be used to control console 121 and/or additional electronic devices via either wireless transmitter 290 or a wired connection (not shown). Wireless transmitter 290 can be implemented using a wide range of wireless transmission technologies and protocols including radio-frequency (RF) or infrared red (IR), Ethernet, WiFi, and BlueTooth.

Cycling the "mode" key of keypad 210 enables the player to selectively control console 121, a television/monitor, one or more electronic devices such as a video tape recorder (VCR), a digital video recorder (DVR), and a CD/DVD player or recorder. Accordingly, "Mode" key may cycle between choices from a menu which include one or more of "Console", "TV", "VCR", "DVD", "Messaging" and "Phone".

In "Console" mode, controller 131 can be used to play a video game or watch a movie on console 121. Keypad 210 can be used to send messages while playing the video game or movie. The "VOL" key can be used as a cursor, while the "CH" key can be used as an "Enter" key to end of a message. Video and/or audio can be controlled by using the "Mute" key on keypad 210. For example, when "Console" mode is selected using the "Mode" key, cycling the "Mute" key will enable player to select from choices which include "Enable Video & Audio", "Enable Video Only", "Enable Audio Only", and "Mute Video & Audio".

As discussed above, in some embodiments, controller 131 also has a "messaging" mode and/or "phone" mode where keypad 210 can be used as in a manner similar to a telephone key pad for placing voice calls, e.g. VoIP, and or for exchanging textual messages over the internet, e.g., email or short message service (SMS).

Controller 131 also includes game directional controls 222, 224, joysticks 226, 228 and game control buttons 242, 244, 246, 248 for controlling the game playing on console 121. Other input/output devices are also possible, e.g. steering wheel(s), gear selector(s), control level(s), trigger(s) and any other control devices, such as those found on cars, airplanes or boats and weapons.

Left and right speakers 232, 234 are used to output game audio from console 121 and/or messages/alerts from the second player or non-player. Speakers 232, 234 can be mounted on the surface of controller 131, or mounted on adjustable posts attached to controller 131. Speakers 232, 234 can be also detached from controller 131 and coupled to controller 131 via a wired or wireless connection.

Microphone 260 can be monaural or stereo. Microphone 260 can be can be mounted on the surface of controller 131, or mounted on an adjustable post attached to controller 131. Microphone 260 can be detached from controller 131 and coupled to controller 131 via a wired or wireless connection. Microphone 260 can also be mechanically attached to a headset with earphones. Microphone 260 can be used to send audio messages to other players or non-players via console 121.

Camera 250 can be implemented using monochrome, color, infrared red or any other suitable technology. Camera 250 can be mounted on the surface of controller 131, or mounted on an adjustable post attached to controller 131. Alternatively, camera 250 can be detached from controller 131 and coupled to controller 131 via a wired or wireless connection. Images from camera 250 can be sent to other players or non-players as video messages via console 121.

Video display 270 can be based on a LCD, TFT, plasma, LED or any other suitable display technology. Video display 270 can be mounted flush on the surface of controller 131. Video display 270 can also be adjustably mounted to controller 131, such as in a flip-up configuration so that display 270 can be adjusted to suit the player, and display 270 can be in a closed protected position when not in use. In some embodiments, video display 270 is a touch screen display and can also include the functionality of keypad 210.

Audio output 282 can drive either external earphones or external speakers. Video output 288 of controller 131 can drive two-dimensional/three-dimensional glasses or an external video monitor. Game console USB port 284 can be used for sending messages to other players and non-player via console 121, while game console controller port 286 can be used for sending game command signals to console 121.

Other modifications and combinations are also possible. For example, video images can be displayed using a video projector instead of video display 270. It is also possible for a player can wear a headgear (not shown) which includes 2D/3D glasses, earphones and a microphone. The headgear can be coupled to controller 131 via a wired or wireless connection.

Figure 3A:
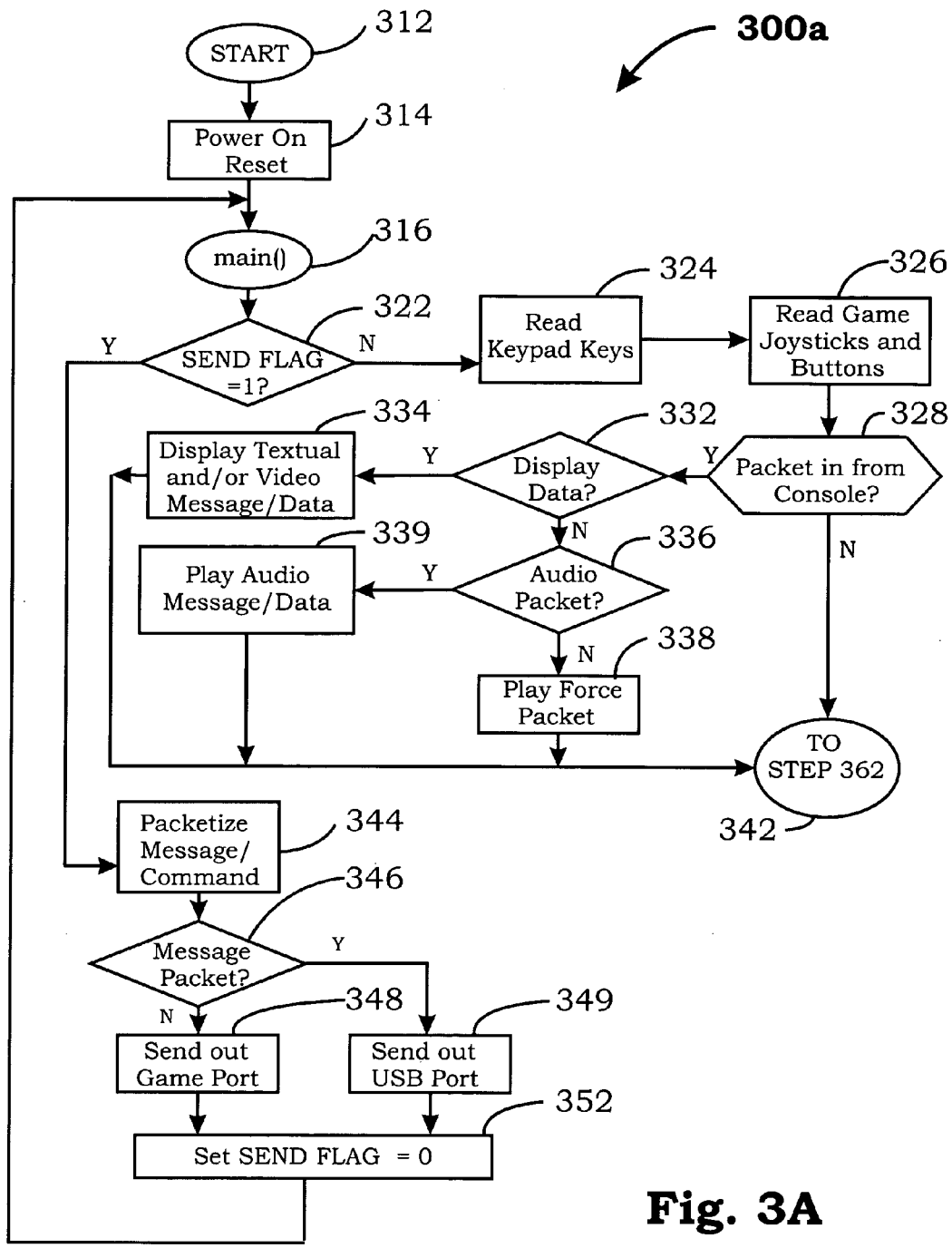
FIGS. 3A and 3B are flow diagrams illustrating the operation of the game controller of FIG. 1.
Figure 3B:
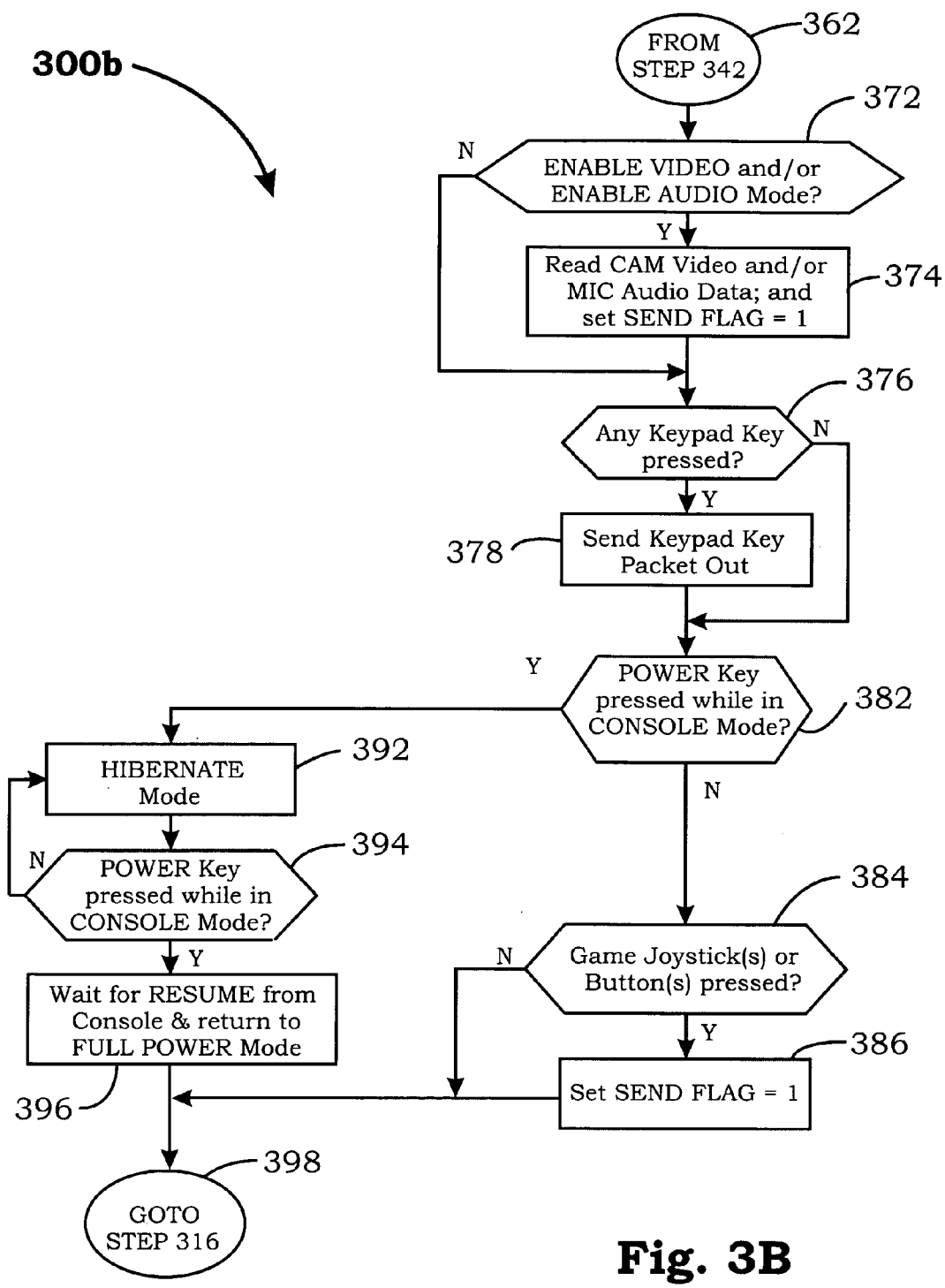

FIGS. 3A and 3B are flow diagrams illustrating the operation of one embodiment of game controller 131. Referring first to FIG. 3A, upon a Power On Reset (step 314), controller 131 senses if Send_Packet_Flag is set (step 322). Send_Packet_Flag is used by controller 131 to determine if a message or game command needs to be sent from controller 131 to console 121.

If Send_Packet_Flag is not set, controller 131 reads keypad 210 (step 324), and also reads game directional controls 222, 224, joysticks 226, 228, or game control buttons 242, 244, 246, 248 (step 326). In step 328, if no packet from game console 121 detected, then controller 131 proceeds to step 362.

If a packet has arrived from game console 121 (step 328), and the packet includes display data (step 332), then the textual message and/or video data is displayed (step 334) on display 270, and controller 131 proceeds to step 362. Display message/data can be from one or more sources, including textual messages from other players or non-players, player/non-player directory information such as IP addresses, and/or game data from console 121, for example, graphical dashboard data from a speedometer, an accelerometer, a tachometer, a gear shift display, an altimeter, a fuel gauge, an oil gauge, a depth gauge, and/or a radar scope, and any other displays found in an airplane, boat, or vehicle. In some embodiments, display 270 can also be configured to display the video signal normally sent by console 121 to a television.

Conversely, if a packet has arrived from game console 121 (step 328), and the packet includes audio data (steps 332 and 336), then the audio data is outputted on speakers 232, 234 (step 339), and controller 131 proceeds to step 362. Audio message/data can be from one or more sources, including audio messages from other players or non-players, and/or game data from console 121, for example, audio effects data from an engine, a weapon, and/or an incoming projectile.

In step 338, if the packet from console 121 is neither a textual, a video nor an audio packet (steps 328, 332, 336), then the packet may be a "motion" packet such as a "tactile feedback force" packet, and controller 131 responses accordingly, for example by vibrating an alerter (not shown) of controller 131. Other uses of "motion" packets include alerts to the player that there is an incoming message. The "motion"

packet can include enough information to identify the sender of the message, for example, two long buzzes followed by one short buzzes can be the identifier for a spouse. The "motion" packet can also include an embedded coded message as well.

In step 322, if Send_Packet_Flag is set, then the player message or game command is packetized (step 344). If the packet includes a message for another player or non-player (step 346), then the packet is routed to USB port 284 to be sent to game console 121 (step 348). Messages can include textual, audio and/or video data. Conversely, if the packet includes a game command for console 121, then the packet is routed to game console 121 via controller port 286 (step 349). Upon sending the command or message packet, controller 131 resets the Send_Packet_Flag (step 352) and proceeds to step 316.

Referring now to FIG. 3B, if controller 131 is in "Enable Video" and/or "Enable Audio" mode (step 372), then the video data from camera 250 and/or audio data from microphone 260 is read and the Send_Packet_Flag is set (step 374).

Controller 131 also senses if any key of keypad 210 has been pressed (step 376), and if so a Keypad Packet is sent to the appropriate device via wireless transmitter 290 (step 378). An example of a Keypad Packet would be an "Increase Volume" key for a television coupled to game console 121.

In step 382, if the "Power" key of keypad 210 is pressed while controller 131 is in "Full Power" mode, then controller 131 goes into a "Hibernation" mode to conserve power (step 392). The "hibernation" mode is especially useful in embodiments where controller 131 is wireless and is not powered by console 121, i.e. battery powered. Controller 131 remains in hibernation until "Power" key of keypad 210 is pressed, and controller 131 stands by for a transition into a "Full Power" mode (step 394). Controller 121 then waits for a "Resume" command from game console 121 before transitioning back to the "Full Power" mode and returning to normal operation (396).

In normal "Full Power" operation, when controller 131 senses that any of joystick game directional controls 222, 224, joysticks 226, 228, or game control buttons 242, 244, 246, 248 has been pressed (384), controller 131 sets the Send_Packet_Flag (step 386), and proceeds to step 316. Controller 131 then repeats flow diagram 330a and 330b of FIGS. 3A and 3B, starting at step 316.

Figure 4:
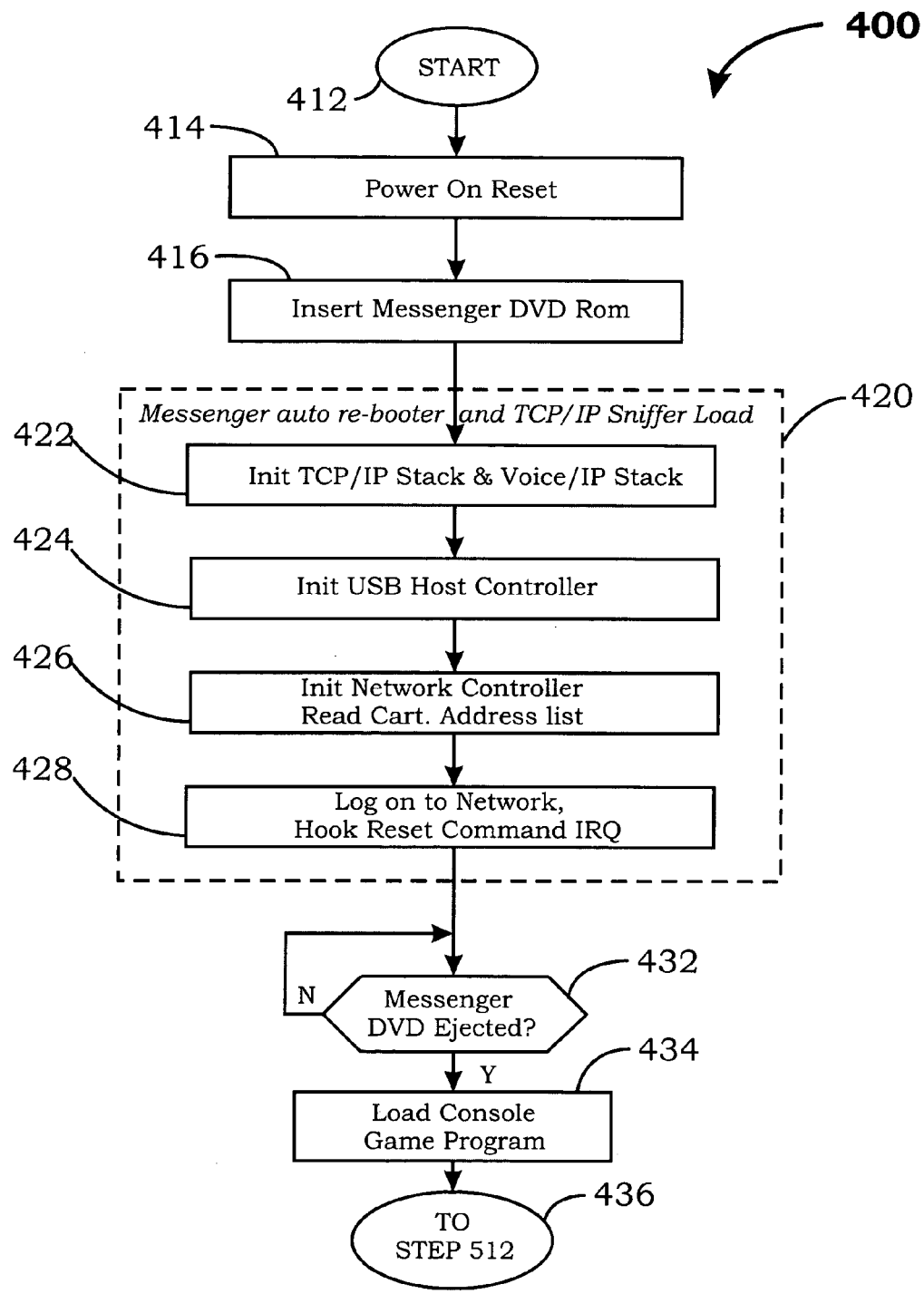
FIGS. 4, 5 and 6 are flow diagrams illustrating the operation of the game console of FIG. 1
Figure 5:
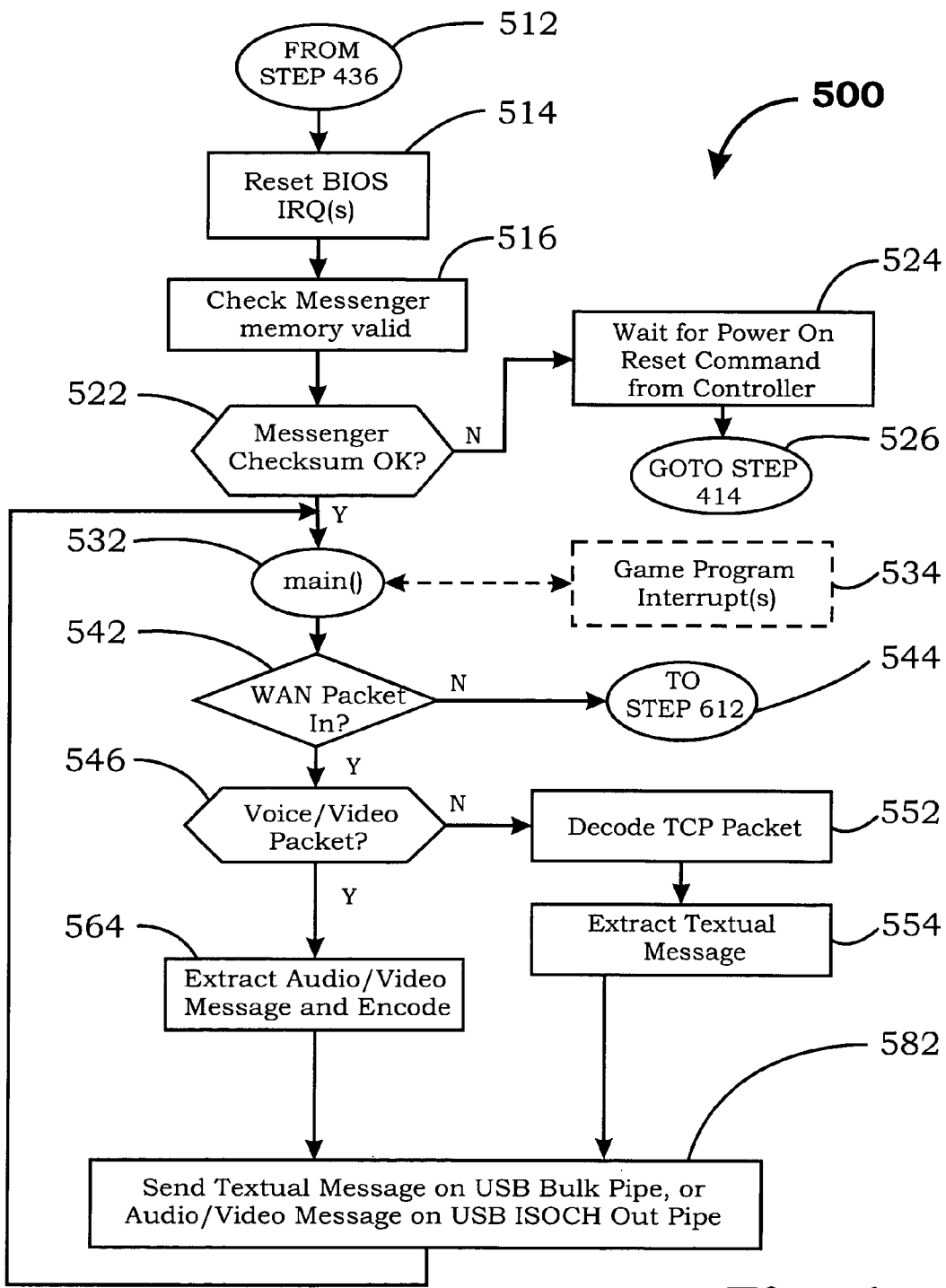
Figure 6:
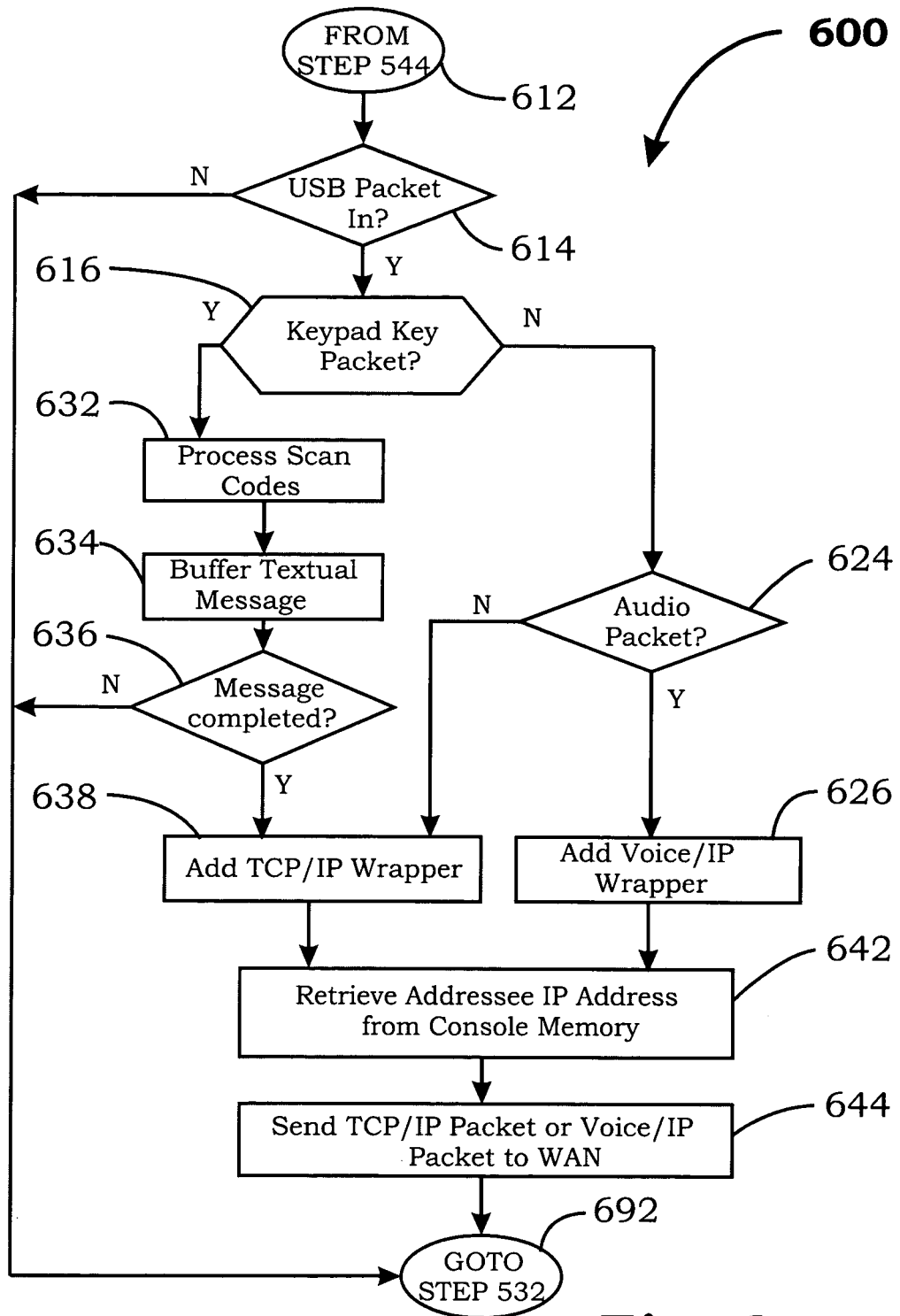
Figure 7:
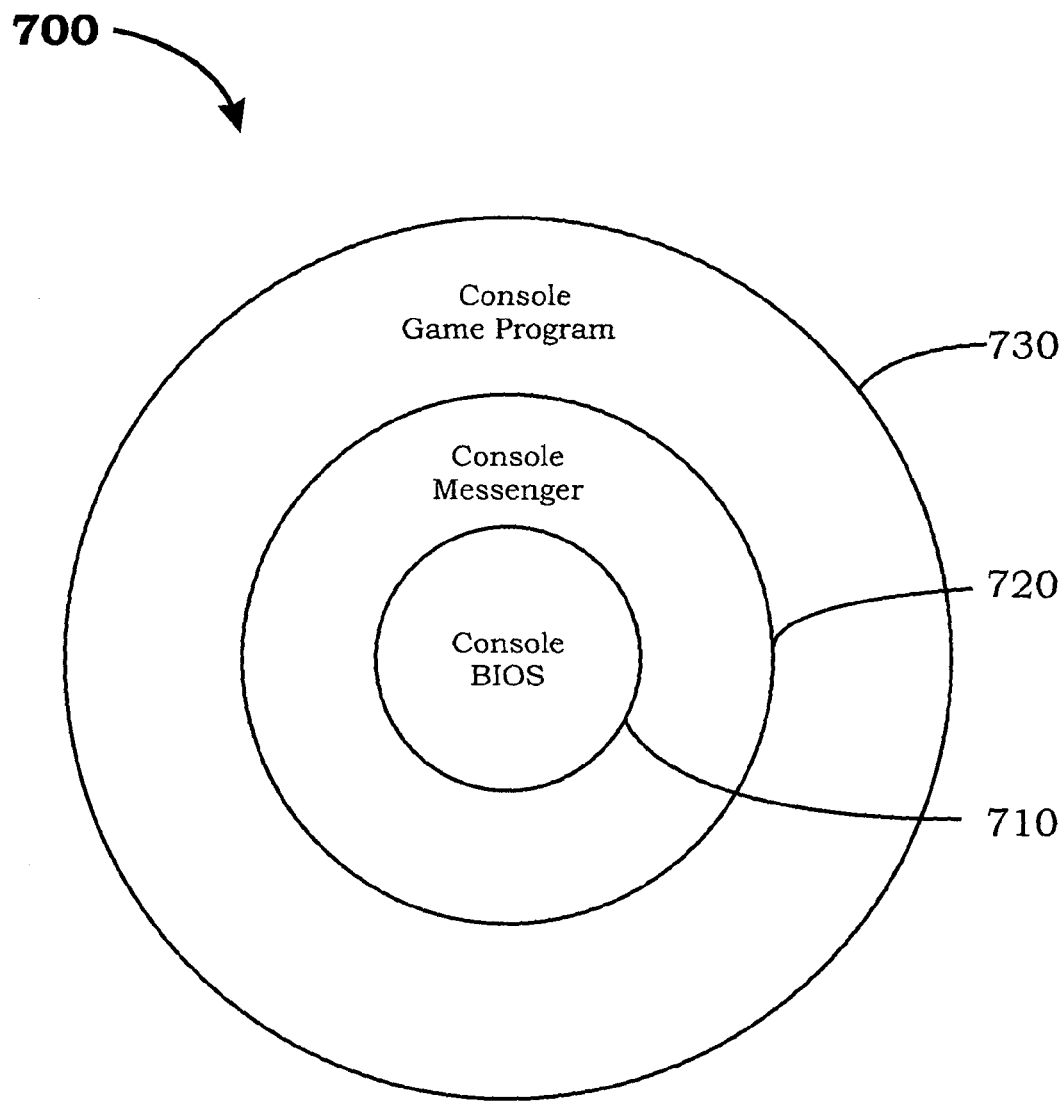
FIG. 7 shows exemplary program layers for the game console of FIG. 1.

FIGS. 4, 5 and 6 are exemplary flow diagrams illustrating the operation of game console 121 which is coupled to game controller 131 as shown in FIG. 1. FIG. 7 illustrates one embodiment of console 121 with multiple software program layers. Referring first to FIGS. 4 and 7, which illustrates an exemplary boot sequence for console 121, in step 414, console 121 executes a Power On Reset and loads a console basic input/output system (BIOS) 710 which functions as an operating system for console 121.

Since console game program 730 for controller 121 is typically stored either in a game cartridge or in a CD/DVD ROM, console messenger 720 of the present invention can also be stored in a similar memory format and inserted into console 121 (step 416). Other methods for storing and downloading console messenger 720 are also possible. For example, console messenger 720 can also be initially stored in a remote location and upon request downloaded onto console 121 via WAN 110. Console messenger 720 can also be stored in firmware on controller 121 and downloaded onto console 121 via USB port 284. Messenger 720 can also be in the firmware of console 121 and hence there will be no need for loading messenger 720 from a source external to console 121.

In this embodiment, console messenger 720 is implemented as middleware and is loaded after the console BIOS but before game program 730. It is also possible to incorporate the present invention into an existing game program by integrating the console messenger 720 and game program 730 into a game program with built-in messaging capability and loaded into console 121 using a single game cartridge or DVD ROM.

Block 420 illustrates an exemplary auto rebooter and a TCP/IP sniffer load sequence for loading console messenger 720. In step 422, a TCP/IP stack and a Voice over IP (VoIP) stack of console messenger 720 are initialized. Console messenger 720 includes a USB Host Controller, responsible for managing the USB Port communications between controller 131 and console 121, which is also initialized (step 424). Console messenger 720 also initializes a Network Controller, responsible for managing communications with other players and/or non-players over the WAN, and reads the game cartridge address list (step 426). A directory of addressees which include information such as names and their respective IP addresses can be stored locally by console 121 and/or at a remote location coupled to WAN 110.

In step 428, console messenger 720 logs player onto the WAN 110 so that connections can be made with other player(s) and/or non-player(s), and messenger 720 also hooks onto Reset Command Interrupt Request (IRQ) of BIOS 710. When messenger 720 is completely loaded into the memory of console 121, messenger DVD ROM is ejected by console 121 (step 432). Upon ejection of messenger DVD ROM, game program 730 on a game DVD ROM is loaded into the memory of console 121, and messenger 720 proceeds to step 512 of FIG. 5.

In step 514 of FIG. 5, messenger 720 resets the appropriate IRQs of BIOS 710 which have been set by console game program 730. Console 121 then verifies that messenger 720 has been properly loaded by computing a checksum of console memory space occupied by messenger 720 (step 516). In step 522 and 524, if the computed memory sum does not match the checksum, console 121 waits for a Power On Reset command from controller 131 before returning to step 414.

When console program layers, BIOS 710, messenger 720 and console game program 730, are successfully loaded in the memory of console 212, messenger 720 is executes its code in the processor of console 212 (step 532), and is subject to interrupts from console game program 730 (box 534).

When an audio or video packet arrived from WAN 110 (steps 542, 546), messenger 720 extracts audio/video data from the packet, encodes the data into a suitable USB format, and then sends the audio/video message on a USB ISOCH Out Pipe to controller 131 (steps 564 and 582). Extraction of audio/video data may include, for example, decoding a pulse-code-modulated (PCM) audio packet.

Conversely, as shown in steps 542 and 546, if a textual message arrived from WAN 110, then messenger 720 decodes the TCP/IP packet, extracts and sends the textual message on a USB Bulk Pipe to controller 131 (steps 552, 554 and 582). Upon sending the video/audio/textual message to controller 131, messenger 720 returns to step 532. In some embodiments, console 121 may also generate game-related audio and/or video data which can be sent to controller 131 using, for example, the USB ISOCH Out Pipe.

FIG. 6 illustrates the processing of a USB packet sent by controller 131 to console 121. As the USB Host, messenger 720 executing on console 121 is responsible for managing USB packets to and from controller 131.

In steps 614, 616, 632, 634 and 636, when a USB Keypad Key packet arrives from controller 131, messenger 720 processes the Scan Codes, and buffers the keystrokes for the textual message until the textual message is completed. A TCP/IP wrapper is then added to form a TCP/IP textual message packet (step 638).

If the USB packet from controller 131 is not a Keypad Key packet, and is an Audio message (step 624), a VoIP wrapper is added to form a VoIP packet (step 626), while a TCP/IP wrapper is added to a Video message to form a TCP/IP Video packet (step 638). Depending on the protocol(s) used, messenger 720 may, for example, encode the PCM Audio data before adding the VoIP wrapper. Other video and audio WAN transmission/compression/encryption protocols known to one skilled in the art are possible, including H.323 (IP Communications), H.263 (Video), H.711 (Audio), and H.723 (Audio).

In steps 642 and 644, when message packet is properly formatted, messenger 720 retrieves the addressee's (another player or non-player) IP address stored in console 121 and sends the textual, video or audio IP packet out to WAN 110. Upon sending the message out to the WAN 110, messenger 720 returns step 532.

Many modifications to controller 131 and game console 121 are also possible. For example, instead of using two wired connections (USB port 284 and game port 286) and a wireless connection (IR transmitter 290) for messages and game commands, controller 131 and console 121 can also use a single wired connection or a single wireless connection.

Although the above exemplary description uses protocols such as PCM, TCP/IP, VoIP, USB, and ISOCH and Bulk pipes, it is possible to use other protocols known to one skilled in the art. In addition, the functionality of controller 131 and messenger 720 of console 121 can be in software, firmware, hardware or combinations thereof.

Advantages of the present invention include the ability to communicate with other players and non-players over WAN 110, the ability to alert the player of incoming messages, the ability to control other electronic devices, and the ability to exchange messages with other non-game-centric devices such as telephones, mobile phones, and computers.

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for communicating with a person playing a video game comprising:

during game play on a game console, receiving a textual message at a video game controller wirelessly connected to the game console, the textual message being from another person over a wide area network and is sent from a second video game controller coupled to the wide area network via a second game console, the game console coupled to a television, wherein the textual message is intended for the person playing the video game using the video game controller; and displaying the textual message on a video display of the video game controller, the video game controller including controls for controlling game play on the game console and a keypad configured for placing voice calls and for sending textual messages over the wide area network.

2. The method of claim 1, wherein the wide area network is an internet.

3. The method of claim 2, wherein the message is wirelessly received from the game console.

4. The method of claim 1 further comprising:

sending a reply to the other person over the wide area network; and displaying the reply for the other person.

5. The method of claim 4, wherein the other person is using the second video game controller wirelessly connected to the second game console.

6. A game controller comprising:

at least controls for controlling game play on a game console;

a wireless connection to a wide area network;

a wireless connection to a game console coupled to a television, wherein the game console is configured for use by a first person playing a game using the game controller;

a keypad configured for placing voice calls and for sending textual messages over the wide area network;

a display of the game controller configured to display a textual message for the first person playing the game, the textual message being from a second person over the wide area network and is sent from a second game controller coupled to the wide area network via a second game console.

7. The game controller of claim 6, wherein the wide area network is an internet.

8. The game controller of claim 7, wherein the message is wirelessly received from the game console.

9. The game controller of claim 7, wherein the game controller is further configured to send a reply to the second person over the wide area network.

10. The game controller of claim 9, further comprising the keypad configured for inputting the reply to be sent to the second person.

11. The game controller of claim 10, wherein the keypad is configured to control one of a television, an analog video recorder, and a digital video recorder.

12. The game controller of claim 10, wherein the keypad is configured to control the game console to play a movie.

13. The game controller of claim 9, wherein the second person is using the second game controller wirelessly connected to the second game console.

14. The game controller of claim 6, further comprising a camera configured for inputting video data for a reply to be sent to the second person over the wide area network.

15. The game controller of claim 6, further comprising a microphone configured for inputting audio data for a reply to be sent to the second person over the wide area network.

16. The game controller of claim 6, further comprising at least one speaker configured for receiving audio data from the second person.

17. The game controller of claim 6, further comprising an alerter configured for receiving an alert from the second person.

18. The game controller of claim 17 wherein the alerter is a mechanical device.

* * * * *